United States Patent
Chiang et al.

(10) Patent No.: US 9,787,201 B2
(45) Date of Patent: Oct. 10, 2017

(54) BIDIRECTIONAL ISOLATED MULTI-LEVEL DC-DC CONVERTER AND METHOD THEREOF

(71) Applicant: Ablerex Electronics Co., Ltd., New Taipei (TW)

(72) Inventors: Wen-Jung Chiang, New Taipei (TW); Kuo-Fang Huang, New Taipei (TW); Wen-Chung Chen, New Taipei (TW)

(73) Assignee: Ablerex Electronics Co., Ltd., New Taipei (TW)

(*) Notice: Subject to any disclaimer, the term of this patent is extended or adjusted under 35 U.S.C. 154(b) by 0 days.

(21) Appl. No.: 15/202,646

(22) Filed: Jul. 6, 2016

(65) Prior Publication Data

US 2017/0264205 A1    Sep. 14, 2017

(30) Foreign Application Priority Data

Mar. 10, 2016 (TW) .............................. 105107356 A

(51) Int. Cl.
*H02M 3/335* (2006.01)
*H02M 1/08* (2006.01)

(52) U.S. Cl.
CPC ... *H02M 3/33546* (2013.01); *H02M 3/33553* (2013.01); *H02M 1/08* (2013.01)

(58) Field of Classification Search
CPC ............................................. H02M 3/00–5/00
USPC ................................................. 363/17, 21.01
See application file for complete search history.

(56) References Cited

U.S. PATENT DOCUMENTS

| 6,191,957 | B1* | 2/2001 | Peterson | H02M 3/33507 363/132 |
|---|---|---|---|---|
| 2006/0176719 | A1* | 8/2006 | Uruno | H02M 3/158 363/89 |
| 2009/0059622 | A1 | 3/2009 | Shimada et al. | |
| 2012/0098341 | A1 | 4/2012 | Shimada et al. | |
| 2016/0087545 | A1* | 3/2016 | Higaki | H02J 7/0054 363/17 |
| 2016/0181944 | A1* | 6/2016 | James | B60L 11/1816 363/17 |

* cited by examiner

*Primary Examiner* — Harry Behm
*Assistant Examiner* — Peter Novak
(74) *Attorney, Agent, or Firm* — Alan D. Kamrath; Kamrath IP Lawfirm, P.A.

(57) ABSTRACT

A DC-DC converter is operated in a boost mode by operating a plurality of low-voltage side switches with a first fixed duty cycle (greater than 0.5), with cutting off a plurality of the first high-voltage side switches and a plurality of the second high-voltage side switches, with conducting a plurality of the first diodes of the first high-voltage side switches and a plurality of the second diodes of the second high-voltage side switches, and with alternatively conducting and cutting off a bidirectional switch. In a buck mode, the low-voltage side switches are cut off and a plurality of diodes of the low-voltage side switches are conducted. Furthermore, the first high-voltage side switches are complemented and are operated with a second fixed duty cycle (less than 0.5) while the second high-voltage side switches are conducted and cut off alternatively and the bidirectional switch is switched on and off.

37 Claims, 7 Drawing Sheets

BIDIRECTIONAL ISOLATED MULTI-LEVEL DC-DC CONVERTER AND METHOD THEREOF

BACKGROUND OF THE INVENTION

1. Field of the Invention

The present invention relates to a bidirectional isolated multi-level DC-DC converter and control method thereof. Particularly, the present invention relates to the bidirectional isolated multi-level DC-DC converter and control method thereof for reducing the dimensions.

2. Description of the Related Art

Generally, a conventional isolated DC-DC converter has been widely used in various industrial fields. Even though the conventional isolated DC-DC converter has a specific advantage of simple and easy control, it has several drawbacks in operation, including low efficiencies, high ripple quantities, high electromagnetic interference and requiring the use of a filter circuit with a large capacity. Conversely, a conventional multi-level DC-DC converter has several advantages of relatively higher efficiencies, relatively lower electromagnetic interference and allowing the use of a filter circuit with a relatively lower capacity even though it has a drawback of requiring sophisticated control.

For example, FIG. 1 shows a schematic view of a conventional multi-level DC-DC converter in accordance with the prior art. Referring initially to FIG. 1, the multi-level DC-DC converter 9 includes a transformer 90 which has a low voltage side (left side in FIG. 1) and a high voltage side (right side in FIG. 1). The multi-level DC-DC converter 9 further includes an inductor 911 and four diodes 912 connected thereto at the low voltage side of the transformer 90. Correspondingly, the multi-level DC-DC converter 9 also includes six high-voltage side switches 92 and two diodes 93 connected thereto at the high voltage side of the transformer 90.

However, the above-mentioned multi-level DC-DC converter 9 has several drawbacks, including a sophisticated structure at the high voltage side of the transformer 90, an increase of total manufacturing cost and dimensions and unidirectional power transmission. In order to simplify the structure, lower manufacturing cost and minimize dimensions, a number of components (e.g. two diodes 93) at the high voltage side of the transformer 90 must be decreased.

For example, U.S. Patent Publication No. 20090059622, entitled "Bi-directional DC-DC converter and method for controlling the same," discloses a bi-directional DC-DC converter has a transformer for connecting a voltage type full bridge circuit connected to a first power source and a current type switching circuit connected to a second power source. A voltage clamping circuit constructed by switching elements and a clamping capacitor is connected to the current type switching circuit. The converter has a control circuit for cooperatively making switching elements operative to control a current flowing in a resonance reactor.

Another U.S. Patent Publication No. 20120098341, entitled "Bidirectional DC-DC converter and control method thereof," discloses a small-size, high-efficiency, isolated, bidirectional DC-DC converter. The bidirectional DC-DC converter includes a transformer in which windings are magnetically coupled, switching circuits, a diode which is connected in parallel with a switch, smoothing capacitors, and a control section. First and second DC power supplies, which are connected in parallel with the smoothing capacitors, respectively, provide bidirectional electrical power transfer. When electrical power is to be transferred from the first DC power supply to the second DC power supply, the switch is maintained in the ON state. When, on the other hand, electrical power is to be transferred from the second DC power supply to the first DC power supply, the switch is maintained in the OFF state to prevent a reverse electrical power flow from the first DC power supply.

However, there is a need of improving the bidirectional DC/DC converter disclosed in U.S. Patent Publication No. 20090059622 and U.S. Patent Publication No. 20120098341 for simplifying the entire structure and enhancing the power conversion efficiency. The above-mentioned patent publications are incorporated herein by reference for purposes including, but not limited to, indicating the background of the present invention and illustrating the state of the art.

As is described in greater detail below, the present invention provides a bidirectional isolated multi-level DC-DC converter and control method thereof. A DC-DC converter is adjustably operated in a boost mode or a buck mode in such a way to overcome the problems of the conventional bidirectional DC-DC converter.

SUMMARY OF THE INVENTION

The primary objective of this invention is to provide a bidirectional isolated multi-level DC-DC converter and control method thereof for a boost mode. The DC-DC converter includes a low voltage side and a high voltage side. In the boost mode, a plurality of low-voltage side switches is operated with a first fixed duty cycle which is greater than 0.5, while a plurality of first high-voltage side switches and a plurality of second high-voltage side switches are switched off. Furthermore, a plurality of first diodes of the first high-voltage side switches and a plurality of second diodes of the second high-voltage side switches are conducted, and a bidirectional switch is switched on and off to control a first DC output voltage at the high voltage side. Advantageously, the bidirectional isolated multi-level DC-DC converter and conversion method of the present invention are successful in minimizing the dimensions, reducing the manufacturing cost and enhancing the operational efficiency.

Another objective of this invention is to provide a bidirectional isolated multi-level DC-DC converter and control method thereof for a buck mode. The DC-DC converter includes a low voltage side and a high voltage side. In the buck mode, a plurality of low-voltage side switches is switched off, and a plurality of diodes of the low-voltage side switches is conducted. Furthermore, a plurality of first high-voltage side switches is operated complementary with a second fixed duty cycle which is less than 0.5 while a plurality of second high-voltage side switches is alternatively switched on and off, and a bidirectional switch is switched on and off to control a second DC output voltage at the low voltage side. Advantageously, the bidirectional isolated multi-level DC-DC converter and conversion method of the present invention are successful in minimizing the dimensions, reducing the manufacturing cost and enhancing the operational efficiency.

The bidirectional isolated multi-level DC-DC converter in accordance with an aspect of the present invention includes:

a DC-DC converter including a low voltage side and a high voltage side;

a transformer provided in the DC-DC converter, with the transformer including a primary side and a secondary side, with the secondary side having a first arm and a second arm, with the primary side and the secondary side corresponding to the low voltage side and the high voltage side of the DC-DC converter;

an inductor provided in the primary side of the transformer;

a plurality of low-voltage side switches provided in the primary side of the transformer;

a plurality of first high-voltage side switches connected with the first arm of the secondary side of the transformer;

a plurality of second high-voltage side switches connected with the second arm of the secondary side of the transformer;

a capacitor set provided in the secondary side of the transformer, with the capacitor set including a first capacitor and a second capacitor between which a connection point is provided; and a bidirectional switch connected between the second arm of the secondary side of the transformer and the capacitor set.

When the DC-DC converter is operated in a boost mode, the plurality of low-voltage side switches is operated with a first fixed duty cycle which is greater than 0.5, with switching off the plurality of first high-voltage side switches and the plurality of second high-voltage side switches, with conducting a plurality of first diodes of the first high-voltage side switches and a plurality of second diodes of the second high-voltage side switches, and with switching on and off the bidirectional switch to control a first DC output voltage at the high voltage side.

When the DC-DC converter is operate in a buck mode, the plurality of low-voltage side switches is switched off, and a plurality of diodes of the low-voltage side switches is conducted, with operating the plurality of first high-voltage side switches complementary with a second fixed duty cycle which is less than 0.5, with alternatively switching on and off the plurality of second high-voltage side switches, and with switching on and off the bidirectional switch to control a second DC output voltage at the low voltage side.

In a separate aspect of the present invention, the plurality of low-voltage side switches includes four switches.

In a further separate aspect of the present invention, each of the diodes reverse-connects with each of the low-voltage side switches in parallel.

In yet a further separate aspect of the present invention, the plurality of first high-voltage side switches includes two first switches, and the plurality of second high-voltage side switches includes two second switches.

In yet a further separate aspect of the present invention, the bidirectional switch connects with a connection point between the two second switches connected with the second arm of the secondary side of the transformer.

In yet a further separate aspect of the present invention, the first capacitor of the capacitor set has a capacitance identical with that of the second capacitor of the capacitor set.

In yet a further separate aspect of the present invention, the bidirectional switch includes two third switches.

In yet a further separate aspect of the present invention, the two third switches serially connect with each other in reverse direction.

In yet a further separate aspect of the present invention, when the DC-DC converter is operated in a boost mode, the plurality of low-voltage side switches is operated with the first fixed duty cycle which is greater than 0.5, with switching off the plurality of first high-voltage side switches and the plurality of second high-voltage side switches, with conducting the plurality of first diodes of the first high-voltage side switches and the plurality of second diodes of the second high-voltage side switches, and with switching on and off the two third switches of the bidirectional switch.

In yet a further separate aspect of the present invention, when the DC-DC converter is operated in a buck mode, the plurality of low-voltage side switches is switched off, and the plurality of diodes of the low-voltage side switches is conducted, with operating the plurality of first high-voltage side switches complementary with the second fixed duty cycle which is greater than 0.5, with alternatively switching on and off the plurality of second high-voltage side switches, and with switching on and off the two third switches of the bidirectional switch.

In yet a further separate aspect of the present invention, the bidirectional switch includes a diode set and a fourth switch connected thereto in parallel.

In yet a further separate aspect of the present invention, the fourth switch connects with a connection point between the first capacitor and the second capacitor of the capacitor set.

In yet a further separate aspect of the present invention, the diode set includes four diodes connected with each other to form a bridge circuit.

In yet a further separate aspect of the present invention, when the DC-DC converter is operated in a boost mode, the plurality of low-voltage side switches is operated with the first fixed duty cycle which is greater than 0.5, with switching off the plurality of first high-voltage side switches and the plurality of second high-voltage side switches, with conducting the plurality of first diodes of the first high-voltage side switches and the plurality of second diodes of the second high-voltage side switches, and with switching on and off the fourth switch of the bidirectional switch.

In yet a further separate aspect of the present invention, when the DC-DC converter is operated in a buck mode, the plurality of low-voltage side switches is switched off, and the plurality of diodes of the low-voltage side switches is conducted, with operating the plurality of first high-voltage side switches complementary with the second fixed duty cycle which is less than 0.5, with alternatively switching on and off the plurality of second high-voltage side switches, and with switching on and off the fourth switch of the bidirectional switch.

In yet a further separate aspect of the present invention, the primary side of the transistor connects with an inductor, with operating the DC-DC converter to reduce a change in voltage of the inductor.

The control method of the bidirectional isolated multi-level DC-DC converter in accordance with an aspect of the present invention includes:

providing a DC-DC converter, with the DC-DC converter including a transformer, with the transformer including a primary side and a secondary side, and with the primary side and the secondary side corresponding to a low voltage side and a high voltage side of the DC-DC converter;

operating the plurality of low-voltage side switches with a first fixed duty cycle which is greater than 0.5 when the DC-DC converter is operated in a boost mode;

switching off a plurality of first high-voltage side switches and a plurality of second high-voltage side switches, with conducting a plurality of first diodes of the first high-voltage side switches and a plurality of second diodes of the second high-voltage side switches; and switching on and off a bidirectional switch to control a first DC output voltage at the high voltage side.

In a separate aspect of the present invention, the secondary side of the transformer includes a first arm, a second arm and a capacitor set.

In a further separate aspect of the present invention, the first high-voltage side switches connect with the first arm of the secondary side of the transformer, the second high-voltage side switches connect with the second arm of the secondary side of the transformer, and the bidirectional switch connects with the second arm of the secondary side of the transformer.

In yet a further separate aspect of the present invention, the capacitor set provided in the secondary side of the transformer includes a first capacitor and a second capacitor between which a connection point is provided.

In yet a further separate aspect of the present invention, the bidirectional switch connects between the second arm of the secondary side of the transformer and the connection point between the first capacitor and the second capacitor.

In yet a further separate aspect of the present invention, the plurality of low-voltage side switches includes four switches.

In yet a further separate aspect of the present invention, each of the diodes reverse-connects with each of the low-voltage side switches in parallel.

In yet a further separate aspect of the present invention, the plurality of first high-voltage side switches includes two first switches, and the plurality of second high-voltage side switches includes two second switches.

In yet a further separate aspect of the present invention, the bidirectional switch connects with a connection point between the two second switches connected with a second arm of the secondary side of the transformer.

In yet a further separate aspect of the present invention, a first capacitor of the capacitor set has a capacitance identical with that of a second capacitor of the capacitor set.

In yet a further separate aspect of the present invention, the bidirectional switch includes two third switches.

In yet a further separate aspect of the present invention, the two third switches serially connect with each other in reverse direction.

In yet a further separate aspect of the present invention, when the DC-DC converter is operated in a boost mode, the plurality of low-voltage side switches is operated with the first fixed duty cycle which is greater than 0.5, with switching off the plurality of first high-voltage side switches and the plurality of second high-voltage side switches, with conducting the plurality of first diodes of the first high-voltage side switches and the plurality of second diodes of the second high-voltage side switches, and with switching on and off the two third switches of the bidirectional switch.

In yet a further separate aspect of the present invention, the bidirectional switch includes a diode set and a fourth switch connected thereto in parallel.

In yet a further separate aspect of the present invention, the fourth switch connects with a connection point between a first capacitor and a second capacitor of a capacitor set.

In yet a further separate aspect of the present invention, the diode set includes four diodes connected each other to form a bridge circuit.

In yet a further separate aspect of the present invention, when the DC-DC converter is operated in a boost mode, the plurality of low-voltage side switches is operated with the first fixed duty cycle which is greater than 0.5, with switching off the plurality of first high-voltage side switches and the plurality of second high-voltage side switches, with conducting the plurality of first diodes of the first high-voltage side switches and the plurality of second diodes of the second high-voltage side switches, and with switching on and off the fourth switch of the bidirectional switch.

In yet a further separate aspect of the present invention, the primary side of the transistor connects with an inductor, with operating the DC-DC converter to reduce a change in voltage of the inductor.

The control method of the bidirectional isolated multi-level DC-DC converter in accordance with another aspect of the present invention includes:

providing a DC-DC converter, with the DC-DC converter including a transformer, with the transformer including a primary side and a secondary side, with the primary side and the secondary side corresponding to a low voltage side and a high voltage side of the DC-DC converter;

switching off a plurality of low-voltage side switches and conducting a plurality of diodes of the low-voltage side switches when the DC-DC converter is operated in a buck mode;

operating a plurality of first high-voltage side switches complementary with a second fixed duty cycle which is less than 0.5; and alternatively switching on and off a plurality of second high-voltage side switches and switching on and off a bidirectional switch to control a second DC output voltage at the low voltage side.

In a separate aspect of the present invention, the secondary side of the transformer includes a first arm, a second arm and a capacitor set.

In a further separate aspect of the present invention, the first high-voltage side switches connect with the first arm of the secondary side of the transformer, the second high-voltage side switches connect with the second arm of the secondary side of the transformer, and the bidirectional switch connects with the second arm of the secondary side of the transformer.

In yet a further separate aspect of the present invention, the capacitor set provided in the secondary side of the transformer includes a first capacitor and a second capacitor between which a connection point is provided.

In yet a further separate aspect of the present invention, the bidirectional switch connects between the second arm of the secondary side of the transformer and the connection point between the first capacitor and the second capacitor.

In yet a further separate aspect of the present invention, the plurality of low-voltage side switches includes four switches.

In yet a further separate aspect of the present invention, each of the diodes reverse-connects with each of the low-voltage side switches in parallel.

In yet a further separate aspect of the present invention, the plurality of first high-voltage side switches includes two first switches, and the plurality of second high-voltage side switches includes two second switches.

In yet a further separate aspect of the present invention, the bidirectional switch connects with a connection point between the two second switches connected with a second arm of the secondary side of the transformer.

In yet a further separate aspect of the present invention, a first capacitor of the capacitor set has a capacitance identical with that of a second capacitor of the capacitor set.

In yet a further separate aspect of the present invention, the bidirectional switch includes two third switches.

In yet a further separate aspect of the present invention, the two third switches serially connect with each other in reverse direction.

In yet a further separate aspect of the present invention, when the DC-DC converter is operated in a buck mode, the plurality of low-voltage side switches is switched off, and the plurality of diodes of the low-voltage side switches is conducted, with operating the plurality of first high-voltage side switches complementary with the second fixed duty cycle which is greater than 0.5, with alternatively switching on and off the plurality of second high-voltage side switches, and with switching on and off the two third switches of the bidirectional switch.

In yet a further separate aspect of the present invention, the bidirectional switch includes a diode set and a fourth switch connected thereto in parallel.

In yet a further separate aspect of the present invention, the fourth switch connects with a connection point between a first capacitor and a second capacitor of a capacitor set.

In yet a further separate aspect of the present invention, the diode set includes four diodes connected with each other to form a bridge circuit.

In yet a further separate aspect of the present invention, when the DC-DC converter is operated in a buck mode, the plurality of low-voltage side switches is switched off, and the plurality of diodes of the low-voltage side switches is conducted, with operating the plurality of first high-voltage side switches complementary with the second fixed duty cycle which is less than 0.5, with alternatively switching on and off the plurality of second high-voltage side switches, and with switching on and off the fourth switch of the bidirectional switch.

In yet a further separate aspect of the present invention, the primary side of the transistor connects with an inductor, with operating the DC-DC converter to reduce a change in voltage of the inductor.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a bidirectional isolated multi-level DC-DC converter, operation method and control method thereof in accordance with the preferred embodiment of the present invention can be applicable to various multi-level DC-DC converters or other equivalent devices, which are not limitative of the present invention.

Figure 2:
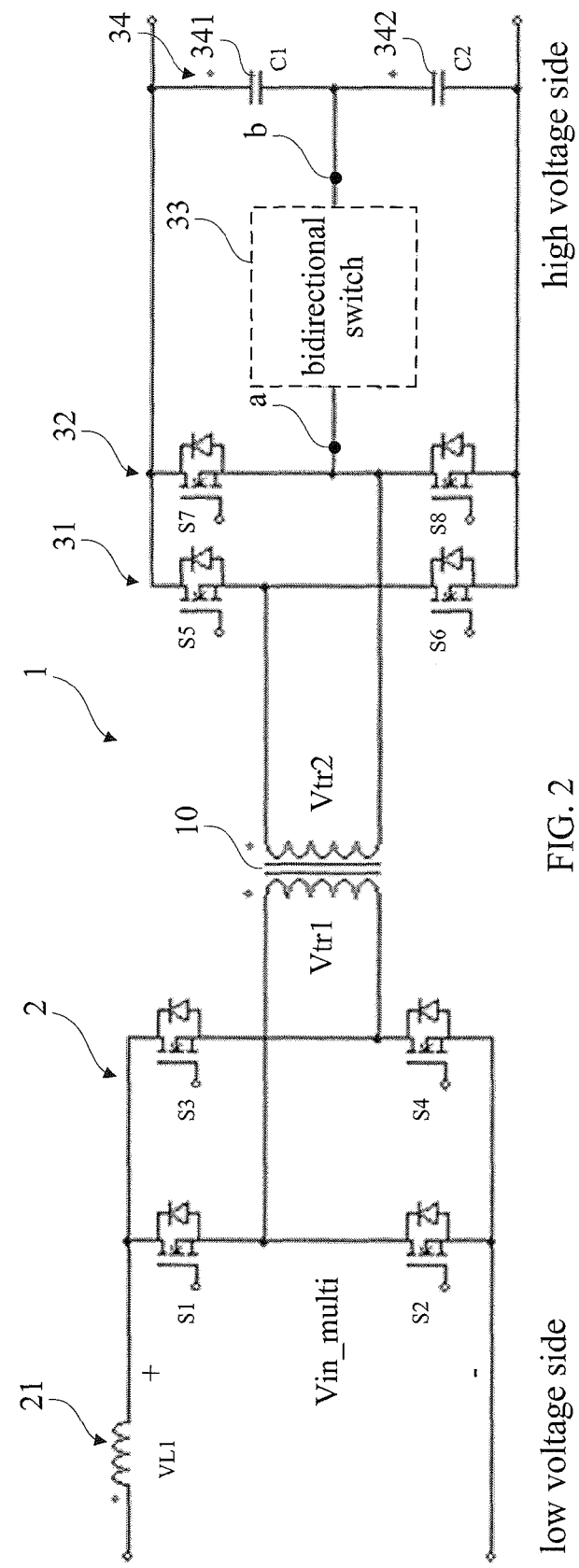
FIG. 2 is a schematic view of a bidirectional isolated multi-level DC-DC converter in accordance with a first preferred embodiment of the present invention.

FIG. 2 shows a schematic view of a bidirectional isolated multi-level DC-DC converter in accordance with a first preferred embodiment of the present invention. Referring now to FIG. 2, the bidirectional isolated multi-level DC-DC converter 1 in accordance with the first preferred embodiment of the present invention includes a transformer 10, a plurality of low-voltage side switches 2, an inductor 21, a plurality of first high-voltage side switches 31, second high-voltage side switches 32, a bidirectional switch 33 and a capacitor set 34.

Figure 1:
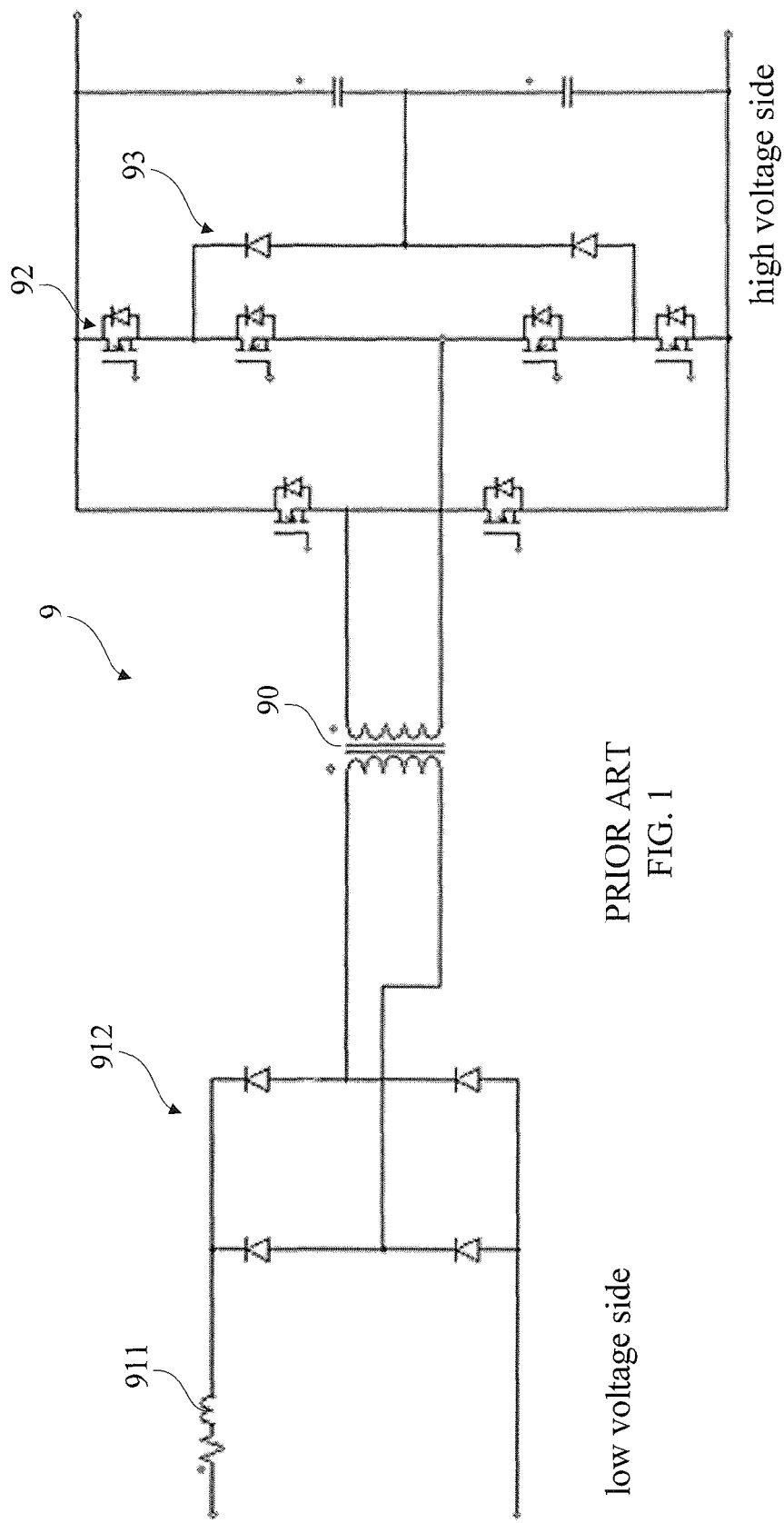
FIG. 1 is a schematic view of a conventional multi-level DC-DC converter in accordance with the prior art.

With continued reference to FIG. 2, by way of example, the bidirectional isolated multi-level DC-DC converter 1 includes a low voltage side (left side in FIG. 2) and a high voltage side (right side in FIG. 1). The transformer 10 includes a primary side and a secondary side, with the primary side corresponding to the low voltage side of the bidirectional isolated multi-level DC-DC converter 1 and the secondary side corresponding to the high voltage side of the bidirectional isolated multi-level DC-DC converter 1. The secondary side of the transformer 10 includes a first arm and a second arm and further connects with the capacitor set 34.

With continued reference to FIG. 2, by way of example, the low-voltage side switches 2 connect with a first position of the primary side of the transformer 10 and the inductor 21 connects with a second position of the primary side of the transformer 10. The low-voltage side switches 2 include four switches S1, S2, S3, S4, with each of the four switches S1, S2, S3, S4 reverse-connecting with a diode.

With continued reference to FIG. 2, by way of example, the first high-voltage side switches 31 include two first switches S5, S6 and the second high-voltage side switches 32 also include two second switches S7, S8. The first high-voltage side switches 32 connect with the first arm of the secondary side of the transformer 10 while the second high-voltage side switches 32 and the bidirectional switch 33 connect with the second arm of the secondary side of the transformer 10. In addition, each of the high-voltage side switches 31 reverse-connects with a first diode in parallel, and each of the second high-voltage side switches 32 also reverse-connects with a second diode in parallel in parallel.

With continued reference to FIG. 2, by way of example, the capacitor set 34 includes a first capacitor 341 and a second capacitor 342 serially connected thereto. The first capacitor 341 has a capacitance identical with that of a second capacitor 342. A total sum of voltages of the first capacitor 341 and the second capacitor 342 approximately equals a half of voltage of the high voltage side of the bidirectional isolated multi-level DC-DC converter 1.

Figure 2A:
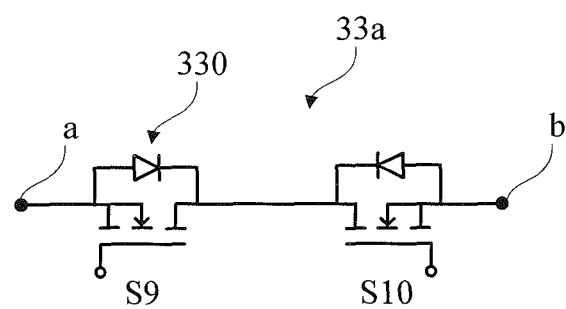
FIG. 2(A) is a schematic view of a first bidirectional switch applied in the bidirectional isolated multi-level DC-DC converter in accordance with a 20 second preferred embodiment of the present invention.

FIG. 2(A) shows a schematic view of a first bidirectional switch applied in the bidirectional isolated multi-level DC-DC converter in accordance with a second preferred embodiment of the present invention, corresponding to that, as best shown in dotted line in FIG. 2. Turning now to FIGS. 2 and 2(A), in comparison with the first embodiment, the bidirectional isolated multi-level DC-DC converter 1 in accordance with the second preferred embodiment of the present invention includes a first bidirectional switch 33a which includes two third switches 330 reverse-connected with each other in parallel between connection points "a" and "b". In addition, the two third switches 330 connect with a first connection point "a" provided between the two second switches S7, S8 and further connect with a second connection point "b" (i.e. center point) provided between the first capacitor 341 and the second capacitor 342.

Figure 2B:
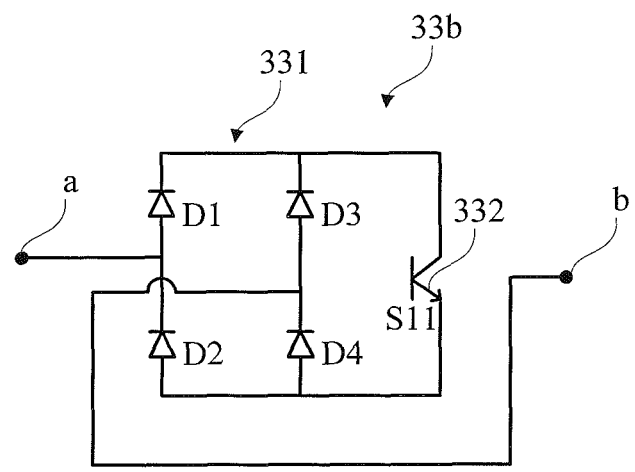
FIG. 2(B) is a schematic view of a second bidirectional switch applied in the bidirectional isolated multi-level DC-DC converter in accordance with a third preferred embodiment of the present invention.

FIG. 2(B) shows a schematic view of a second bidirectional switch applied in the bidirectional isolated multi-level DC-DC converter in accordance with a third preferred embodiment of the present invention, corresponding to that shown in FIG. 2(A). Turning now to FIGS. 2 and 2(B), in comparison with the first and second embodiments, the bidirectional isolated multi-level DC-DC converter 1 in accordance with the third preferred embodiment of the present invention includes a second bidirectional switch 33b which includes a diode set 331 and a fourth switch 332 connected thereto in parallel. The diode set 331 includes four diodes D1, D2, D3, D4 connected with each other to form a bridge circuit or the like. In addition, the combination of the diode set 331 and fourth switch 332 connects with a first connection point "a" provided between the two second switches S7, S8 and further connects with a second connection point "b" (i.e. center point) provided between the first capacitor 341 and the second capacitor 342.

Figure 3:
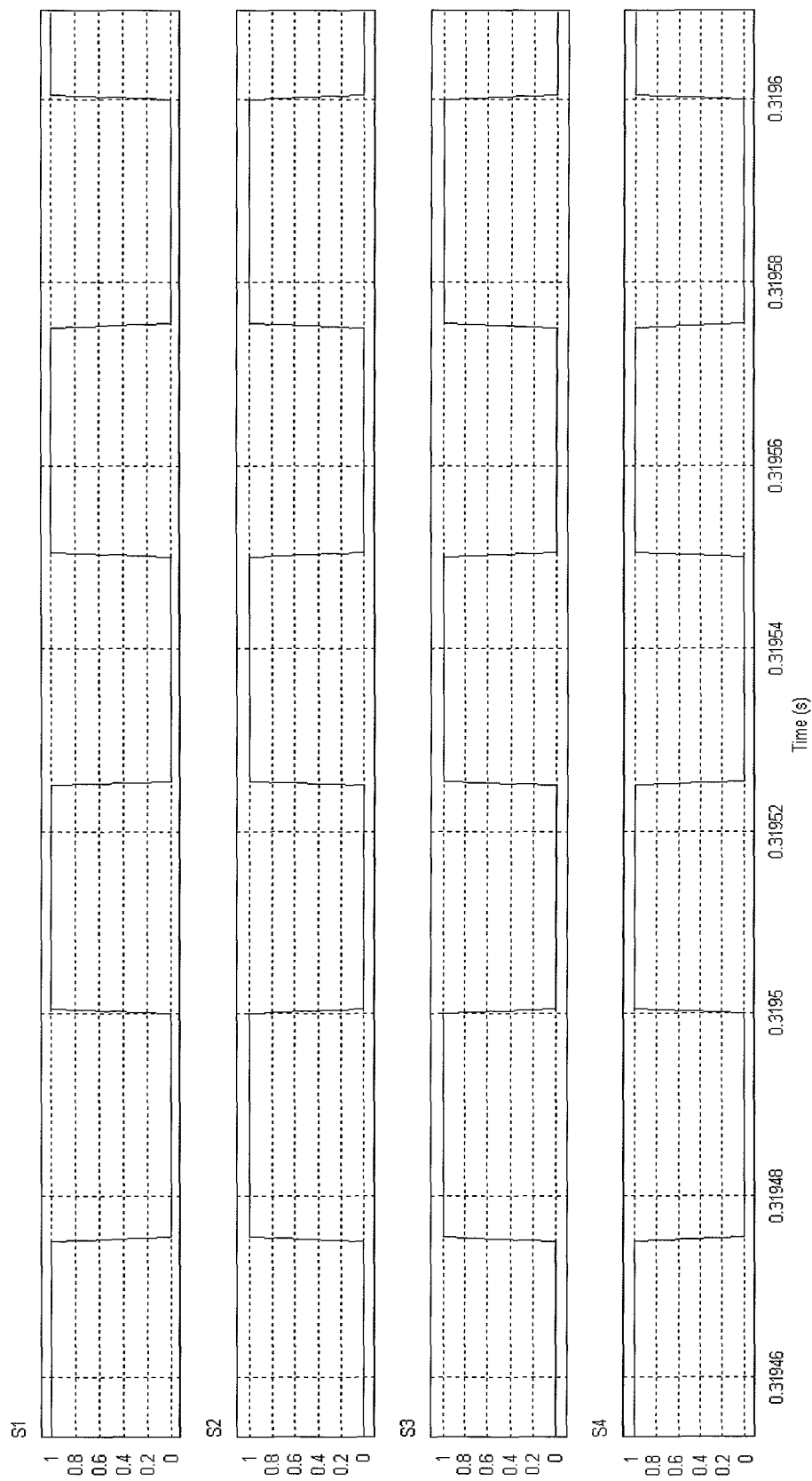
FIG. 3 is a series of waveform diagrams of control signals for four low-voltage side switches applied in the bidirectional isolated multi-level DC-DC converter, which is operated in a boost mode, in accordance with the second preferred embodiment of the present invention.

FIG. 3 shows a series of waveform diagrams of control signals for four low-voltage side switches (S1, S2, S3, S4) applied in the bidirectional isolated multi-level DC-DC converter, which is operated in a boost mode, in accordance with the second preferred embodiment of the present invention. Turning now to FIGS. 2, 2(A) and 3, when the bidirectional isolated multi-level DC-DC converter 1 is operated in the boost mode, the four switches S1, S2, S3, S4 of the low-voltage side switches 2 are operated with a first fixed duty cycle greater than 0.5.

Referring again to FIGS. 2 and 2(A), on the other hand, when the bidirectional isolated multi-level DC-DC converter 1 is operated in the boost mode, the first switches S5, S6 of the first high-voltage side switches 31 and the second switches S7, S8 of the second high-voltage side switches 32 are switched off, with conducting the first diodes of the first high-voltage side switches 31 and the second diodes of the second high-voltage side switches 32.

Figure 4:
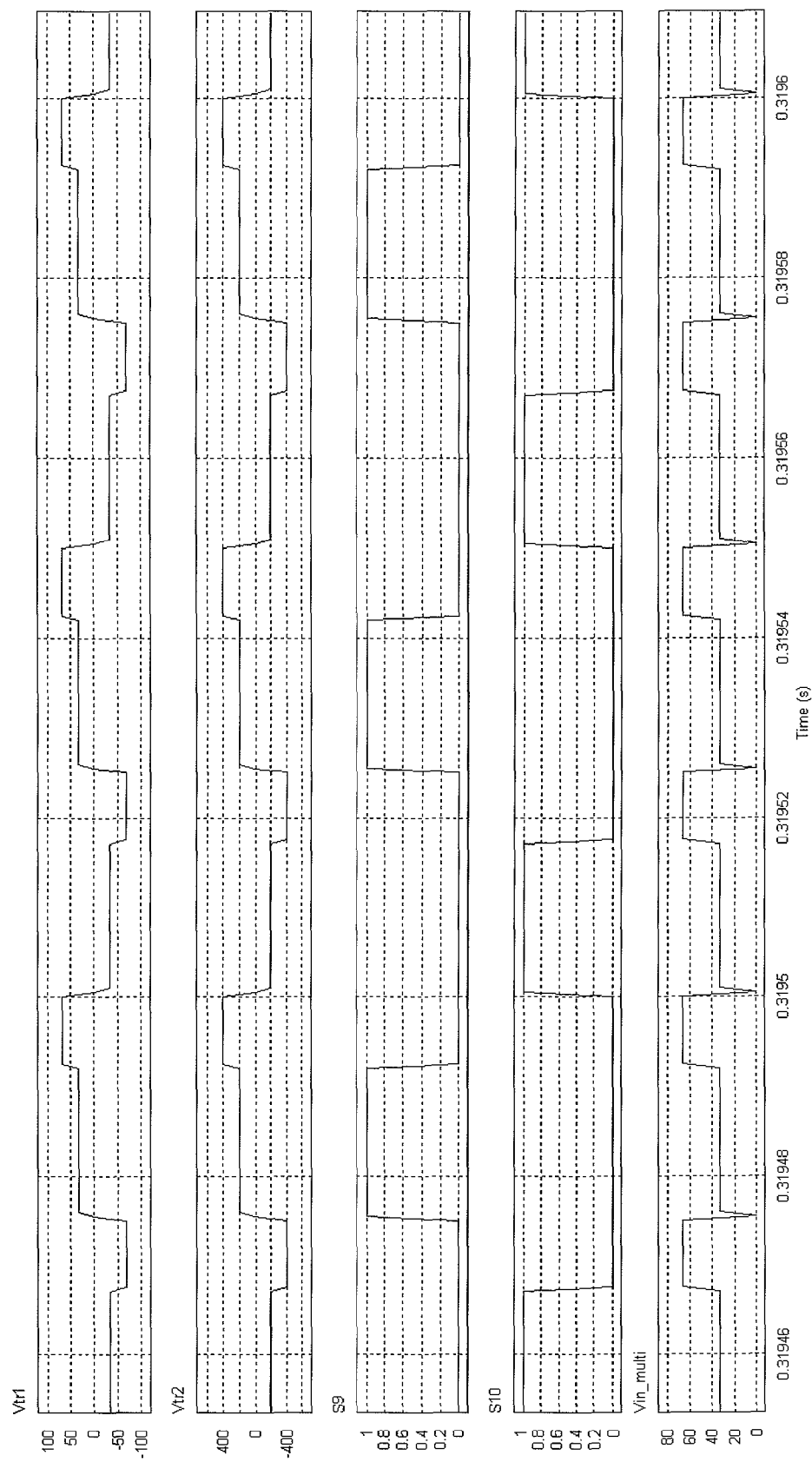
FIG. 4 is a series of waveform diagrams of two side voltages of a transformer, control signals for two switches (i.e. third switches) of a bidirectional switch and a multi-level DC input voltage between low-voltage side switches and an inductor applied in the bidirectional isolated multi-level DC-DC converter, which is operated in the boost mode, in accordance with the second preferred embodiment of the present invention.

FIG. 4 shows a series of waveform diagrams of two side voltages (Vtr1, Vtr2) of a transformer, control signals for two third switches (S9, S10) of a bidirectional switch and a multi-level DC input voltage (Vin_multi) between low-voltage side switches (S1, S2, S3, S4) and an inductor applied in the bidirectional isolated multi-level DC-DC converter, which is operated in a boost mode, in accordance with the second preferred embodiment of the present invention. Turning now to FIGS. 2, 2(A) and 4, when the bidirectional isolated multi-level DC-DC converter 1 is operated in the boost mode, the two third switches 330 of the first bidirectional switch 33a are switched on and off alternatively, as best shown in two waveforms S9, S10 in FIG. 4, to control a first DC output voltage at the high voltage side. When the two third switches 330 are switched off, a secondary-side voltage Vtr2 of the transformer 10 equals approximately the first DC output voltage at the high voltage side. Conversely, when the two third switches 330 are switched on, the secondary-side voltage Vtr2 of the transformer 10 equals approximately a half of the first DC output voltage at the high voltage side.

Referring again FIGS. 2 and 4, when the bidirectional isolated multi-level DC-DC converter 1 is operated in the boost mode, the primary-side voltage Vtr1 and secondary-side voltage Vtr2 of the transformer 10 are multi-level voltages, as best shown in two waveforms Vtr1, Vtr2 in FIG. 4, thereby reducing power lost in current at the primary side of the transformer 10, as indicated in multi-level DC input voltage (waveform Vin_multi in FIG. 4) between the low-voltage side switches 2 and the inductor 21. Advantageously, a change in voltage of the inductor 21 at the primary side of the transformer 10 can be reduced to thereby minimize dimensions of the inductors in design.

Referring back to FIG. 2, conversely, when the bidirectional isolated multi-level DC-DC converter 1 is operated in a buck mode, the four switches S1, S2, S3, S4 of the low-voltage side switches 2 are switched off, with conducting the diodes of the low-voltage side switches S1, S2, S3, S4.

Figure 5:
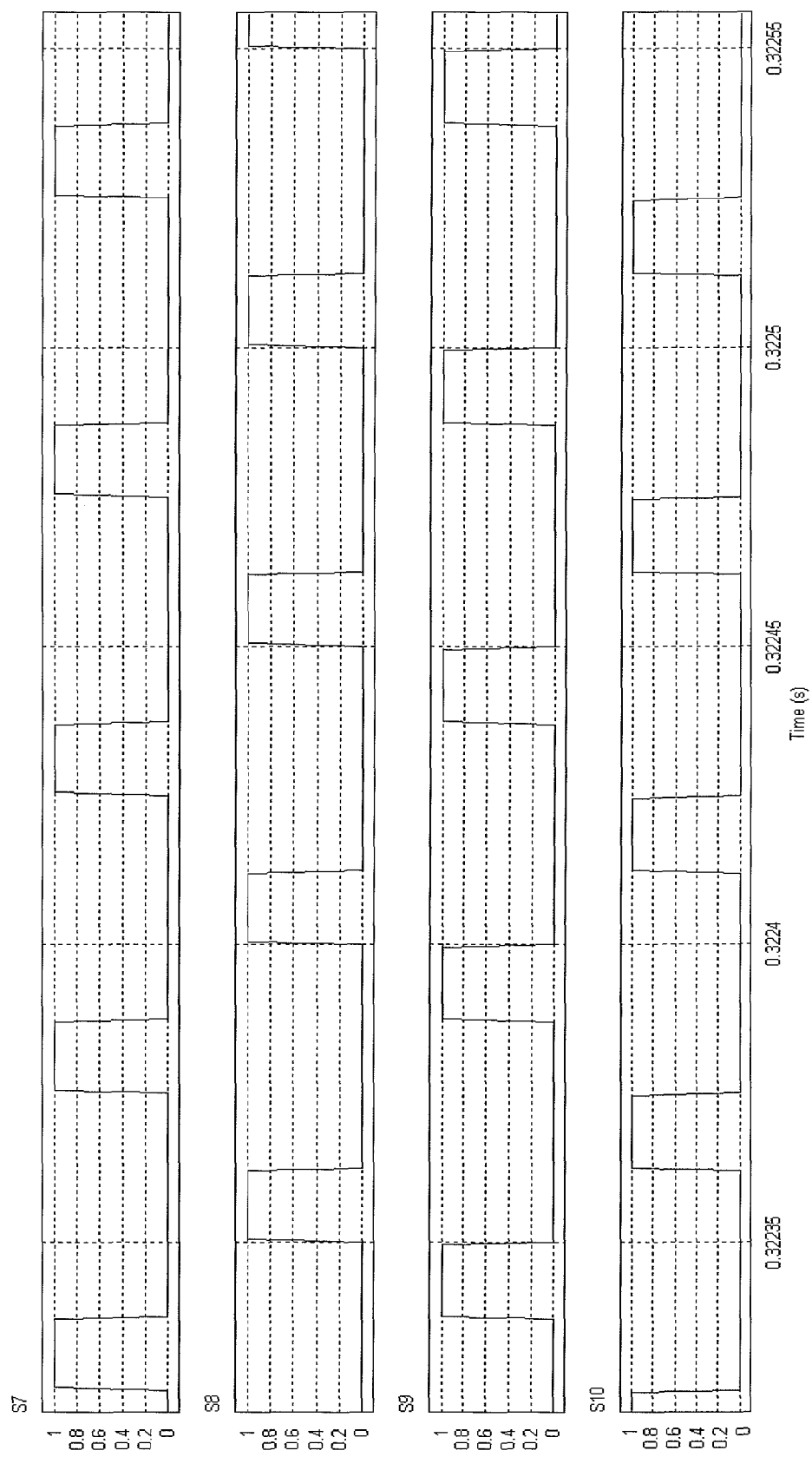
FIG. 5 is a series of waveform diagrams of control signals for two of second high-voltage side switches and two switches (i.e. third switches) of a bidirectional switch applied in the bidirectional isolated multi-level DC-DC converter, which is operated in a buck mode, in accordance with the second preferred embodiment of the present invention.
Figure 6:
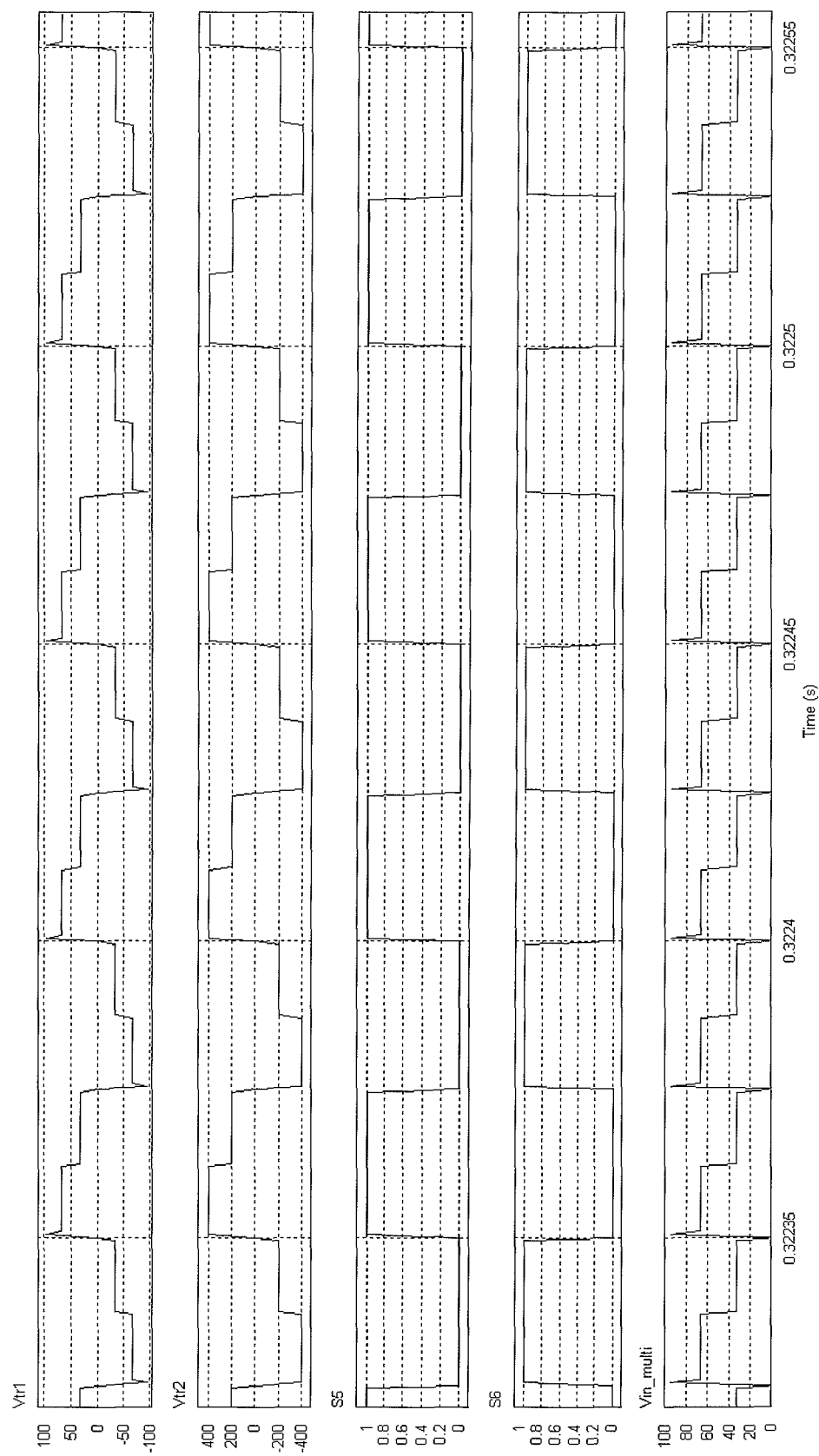
FIG. 6 is a series of waveform diagrams of two side voltages of a transformer, control signals for two of first high-voltage side switches and a multi-level DC input voltage between low-voltage side switches and an inductor applied in the bidirectional isolated multi-level DC-DC converter, which is operated in the buck mode, in accordance with the second preferred embodiment of the present invention.

FIG. 5 shows a series of waveform diagrams of control signals for two second switches (S7, S8) of second high-voltage side switches and two third switches (S9, S10) of a bidirectional switch applied in the bidirectional isolated multi-level DC-DC converter, which is operated in the buck mode, in accordance with the second preferred embodiment of the present invention. FIG. 6 shows a series of waveform diagrams of two side voltages (Vtr1, Vtr2) of a transformer, control signals for two first switches (S5, S6) of the first high-voltage side switches and a multi-level DC input voltage between low-voltage side switches (S1, S2, S3, S4) and an inductor applied in the bidirectional isolated multi-level DC-DC converter, which is operated in the buck mode, in accordance with the second preferred embodiment of the present invention. Turning now to FIGS. 2, 2(A) 5 and 6, when the bidirectional isolated multi-level DC-DC converter 1 is operated in the buck mode, the first switches S5, S6 of the first high-voltage side switches 31 are operated complementary with a second fixed duty cycle less than 0.5, as best shown in two waveforms S5, S6 in FIG. 6. In addition, the two switches S7, S8 of the second high-voltage side switches 32 are alternatively switched on and off and the two third switches 330 of the first bidirectional switch 33a are switched on and off, as best shown in FIGS. 2, 2(A) and 5, to control a second DC output voltage at the low voltage side.

Referring again to FIGS. 2, 2(A), 4, 5 and 6, during switching on the first switch S5, the second switch S8 and the third switch S10 are alternatively switched on and off, and the second switch S7 and the third switch S9 are further cut off. In addition, during switching on the first switch S6, the second switch S7 and the third switch S9 are alternatively switched on and off, and the second switch S8 and the third switch S10 are further cut off to control a second DC output voltage at the low voltage side.

With continued reference to FIGS. 2, 2(A), 4, 5 and 6, when the first bidirectional switch 33a is switched off, the secondary-side voltage Vtr2 of the transformer 10 equals approximately the high-voltage side voltage. When the bidirectional switch 33a is switched on, the secondary-side voltage Vtr2 of the transformer 10 equals approximately a half of the first DC output voltage.

Referring again FIGS. 2, 2(A) and 6, when the bidirectional isolated multi-level DC-DC converter 1 is operated in the buck mode, the primary-side voltage Vtr1 and secondary-side voltage Vtr2 of the transformer 10 are multi-level voltages, as best shown in two waveforms Vtr1, Vtr2 in FIG. 6, thereby reducing power lost in current at the primary side of the transformer 10, as indicated in multi-level DC input voltage (waveform Vin_multi in FIG. 6) between the low-voltage side switches 2 and the inductor 21. Advantageously, a change in voltage of the inductor 21 at the primary side of the transformer 10 can be reduced to thereby minimize dimensions of the inductors in design.

Referring again FIGS. 2(A), 2(B) and 4, when the bidirectional isolated multi-level DC-DC converter 1 of the third preferred embodiment is operated in the boost mode, the fourth switch 332 (S11 in FIG. 2(B)) of the second bidirectional switch 33b is alternatively switched on and off. By way of example, the fourth switch 332 can be controllably switched on and off by combining an OR gate signal with two signals of the two third switches 330 (S9, S10 in FIG. 2(A)), as best shown in waveforms S9, S10 in FIG. 4.

Referring again FIGS. 2(A), 2(B) and 5, when the bidirectional isolated multi-level DC-DC converter 1 of the third preferred embodiment is further operated in the buck mode, the fourth switch 332 (S11 in FIG. 2(B) of the second bidirectional switch 33b is alternatively switched on and off. By way of example, the fourth switch 332 can be controllably switched on and off by combining an OR gate signal with two signals of the two third switches 330 (S9, S10 in FIG. 2(A)), as best shown in waveforms S9, S10 in FIG. 5.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A bidirectional isolated multi-level DC-DC converter comprising:
   a DC-DC converter including a low voltage side and a high voltage side;
   a transformer provided in the DC-DC converter, with the transformer including a primary side and a secondary side, with the secondary side having a first arm and a second arm, with the primary side and the secondary side corresponding to the low voltage side and the high voltage side of the DC-DC converter;
   an inductor provided in the primary side of the transformer;
   a plurality of low-voltage side switches provided in the primary side of the transformer;
   a plurality of first high-voltage side switches connected with the first arm of the secondary side of the transformer;
   a plurality of second high-voltage side switches connected with the second arm of the secondary side of the transformer;
   a capacitor set provided in the secondary side of the transformer, with the capacitor set including a first capacitor and a second capacitor between which a connection point is provided; and
   a bidirectional switch connected between the second arm of the secondary side of the transformer and the capacitor set;
   wherein when the DC-DC converter is operated in a boost mode, the plurality of low-voltage side switches is operated with a first fixed duty cycle which is greater than 0.5, with the plurality of first high-voltage side switches and the plurality of second high-voltage side switches being switched off, with a plurality of first diodes of the first high-voltage side switches and a plurality of second diodes of the second high-voltage side switches being conducted, with the bidirectional switch being switched on and off to control a first DC output voltage at the high voltage side; or
   wherein when the DC-DC converter is operated in a buck mode, the plurality of low-voltage side switches is switched off and a plurality of third diodes of the plurality of low-voltage side switches are conducted, with the plurality of first high-voltage side switches operated complementary with a second fixed duty cycle which is less than 0.5, with the plurality of second high-voltage side switches being alternatively switched on and off, with the bidirectional switch switched on and off to control a second DC output voltage at the low voltage side.

2. The bidirectional isolated multi-level DC-DC converter as defined in claim 1, wherein the plurality of low-voltage side switches includes four switches, with each of the plurality of third diodes reverse-connecting with each of the plurality of low-voltage side switches in parallel.

3. The bidirectional isolated multi-level DC-DC converter as defined in claim 1, wherein the plurality of first high-voltage side switches includes two first switches and the plurality of second high-voltage side switches includes two second switches.

4. The bidirectional isolated multi-level DC-DC converter as defined in claim 3, wherein the bidirectional switch connects with a connection point between the two second switches connected with the second arm of the secondary side of the transformer.

5. The bidirectional isolated multi-level DC-DC converter as defined in claim 1, wherein the first capacitor of the capacitor set has a capacitance identical with that of the second capacitor of the capacitor set.

6. The bidirectional isolated multi-level DC-DC converter as defined in claim 1, wherein the bidirectional switch includes two third switches, with the two third switches serially connecting each other in reverse direction.

7. The bidirectional isolated multi-level DC-DC converter as defined in claim 6, wherein when the DC-DC converter is operated in the boost mode, the two third switches of the bidirectional switch are switched on and off; or, wherein when the DC-DC converter is operated in the buck mode, the two third switches of the bidirectional switch are switched on and off.

8. The bidirectional isolated multi-level DC-DC converter as defined in claim 1, wherein the bidirectional switch includes a diode set and a fourth switch connected thereto in parallel, with connecting the fourth switch connecting with a connection point between the first capacitor and the second capacitor of the capacitor set, with the diode set including four diodes connected to each other to form a bridge circuit.

9. The bidirectional isolated multi-level DC-DC converter as defined in claim 8, wherein when the DC-DC converter is operated in the boost mode, the fourth switch of the bidirectional switch are switched on and off; or, wherein when the DC-DC converter is operated in the buck mode, the fourth switch of the bidirectional switch are switched on and off.

10. The bidirectional isolated multi-level DC-DC converter as defined in claim 1, wherein the primary side of the transformer connects with an inductor, with the DC-DC converter operating to reduce a change in voltage of the inductor.

11. A control method of a bidirectional isolated multi-level DC-DC converter comprising:
providing a DC-DC converter, with the DC-DC converter including a transformer, with the transformer including a primary side and a secondary side, with the primary side and the secondary side corresponding to a low voltage side and a high voltage side of the DC-DC converter;
operating the plurality of low-voltage side switches with a first fixed duty cycle which is greater than 0.5 when the DC-DC converter is operated in boost mode;
switching off a plurality of first high-voltage side switches and a plurality of second high-voltage side switches, with conducting a plurality of first diodes of the first high-voltage side switches and a plurality of second diodes of the second high-voltage side switches; and
switching on and off a bidirectional switch to control a first DC output voltage at the high voltage side, with connecting the bidirectional switch with a connection point between the two second switches connected with a second arm of the secondary side of the transformer.

12. The control method of the bidirectional isolated multi-level DC-DC converter as defined in claim 11, wherein the secondary side of the transformer includes a first arm and a capacitor set.

13. The control method of the bidirectional isolated multi-level DC-DC converter as defined in claim 12, wherein the first high-voltage side switches connects with the first arm of the secondary side of the transformer, and the plurality of second high-voltage side switches connects with the second arm of the secondary side of the transformer.

14. The control method of the bidirectional isolated multi-level DC-DC converter as defined in claim 12, wherein the capacitor set provided in the secondary side of the transformer includes a first capacitor and a second capacitor between which a connection point is provided.

15. The control method of the bidirectional isolated multi-level DC-DC converter as defined in claim 14, wherein the bidirectional switch connects between the second arm of the secondary side of the transformer and the connection point between the first capacitor and the second capacitor.

16. The control method of the bidirectional isolated multi-level DC-DC converter as defined in claim 11, wherein the plurality of low-voltage side switches includes a plurality of third diodes, with each of the plurality of third diodes reverse-connecting with each of the plurality of low-voltage side switches in parallel.

17. The control method of the bidirectional isolated multi-level DC-DC converter as defined in claim 11, wherein the plurality of first high-voltage side switches includes two first switches and the plurality of second high-voltage side switches includes two second switches.

18. The control method of the bidirectional isolated multi-level DC-DC converter as defined in claim 12, wherein a first capacitor of the capacitor set has a capacitance identical with that of a second capacitor of the capacitor set.

19. The control method of the bidirectional isolated multi-level DC-DC converter as defined in claim 11, wherein the bidirectional switch includes two third switches, with the two third switches serially connecting each other in reverse direction.

20. The control method of the bidirectional isolated multi-level DC-DC converter as defined in claim 19, wherein when the DC-DC converter is operated in the boost mode, switching on and off the two third switches of the bidirectional switch.

21. The control method of the bidirectional isolated multi-level DC-DC converter as defined in claim 11, wherein the bidirectional switch includes a diode set and a fourth switch connected thereto in parallel, with the fourth switch connecting with a connection point between a first capacitor and a second capacitor of a capacitor set, and wherein the diode set includes four diodes connected to each other to form a bridge circuit.

22. The control method of the bidirectional isolated multi-level DC-DC converter as defined in claim 21, wherein when the DC-DC converter is operated in the boost mode, switching on and off the fourth switch of the bidirectional switch.

23. The control method of the bidirectional isolated multi-level DC-DC converter as defined in claim 11, wherein the primary side of the transformer connects with an inductor, with operating the DC-DC converter to reduce a change in voltage of the inductor.

24. A control method of a bidirectional isolated multi-level DC-DC converter comprising:
providing a DC-DC converter, with the DC-DC converter including a transformer, with the transformer including a primary side and a secondary side, with the primary side and the secondary side corresponding to a low voltage side and a high voltage side of the DC-DC converter;
switching off a plurality of low-voltage side switches and conducting a plurality of third diodes of the low-voltage side switches when the DC-DC converter is operated in a buck mode;
operating a plurality of first high-voltage side switches complementary with a second fixed duty cycle which is less than 0.5; and
alternatively switching on and off a plurality of second high-voltage side switches and switching on and off a bidirectional switch to control a second DC output voltage at the low voltage side, with connecting the bidirectional switch with a connection point between the two second switches connected with a second arm of the secondary side of the transformer.

25. The control method of the bidirectional isolated multi-level DC-DC converter as defined in claim 24, wherein the secondary side of the transformer includes a first arm and a capacitor set.

26. The control method of the bidirectional isolated multi-level DC-DC converter as defined in claim 25, wherein the plurality of first high-voltage side switches connects with the first arm of the secondary side of the transformer, and the plurality of second high-voltage side switches connects with the second arm of the secondary side of the transformer.

27. The control method of the bidirectional isolated multi-level DC-DC converter as defined in claim 25, wherein the capacitor set provided in the secondary side of the transformer includes a first capacitor and a second capacitor between which a connection point is provided.

28. The control method of the bidirectional isolated multi-level DC-DC converter as defined in claim 27, wherein the bidirectional switch connects between the second arm of the secondary side of the transformer and the connection point between the first capacitor and the second capacitor.

29. The control method of the bidirectional isolated multi-level DC-DC converter as defined in claim 24, wherein the plurality of low-voltage side switches includes four switches, with each of the plurality of third diodes reverse-connecting with each of the plurality of low-voltage side switches in parallel.

30. The control method of the bidirectional isolated multi-level DC-DC converter as defined in claim 24, wherein the plurality of first high-voltage side switches includes two first switches and the plurality of second high-voltage side switches includes two second switches.

31. The control method of the bidirectional isolated multi-level DC-DC converter as defined in claim 24, wherein the bidirectional switch connects with a connection point between the two second switches connected with the second arm of the secondary side of the transformer.

32. The control method of the bidirectional isolated multi-level DC-DC converter as defined in claim 25, wherein a first capacitor of the capacitor set has a capacitance identical with that of a second capacitor of the capacitor set.

33. The control method of the bidirectional isolated multi-level DC-DC converter as defined in claim 24, wherein the bidirectional switch includes two third switches, with the two third switches serially connecting to each other in reverse direction.

34. The control method of the bidirectional isolated multi-level DC-DC converter as defined in claim 33, wherein when the DC-DC converter is operated in the buck mode, the plurality of low-voltage side switches are switched off and the plurality of diodes of the low-voltage side switches are conducted, with operating the plurality of first high-voltage side switches in complementary with the second fixed duty cycle which is greater than 0.5, with alternatively switching on and off the plurality of second high-voltage side switches, with switching on and off the two third switches of the bidirectional switch.

35. The control method of the bidirectional isolated multi-level DC-DC converter as defined in claim 24, wherein the bidirectional switch includes a diode set and a fourth switch connected thereto in parallel, with the fourth switch connecting with a connection point between a first capacitor and a second capacitor of a capacitor set, with the diode set including four diodes connected to each other to form a bridge circuit.

36. The control method of the bidirectional isolated multi-level DC-DC converter as defined in claim 35, wherein when the DC-DC converter is operated in the buck mode, switching on and off the fourth switch of the bidirectional switch.

37. The control method of the bidirectional isolated multi-level DC-DC converter as defined in claim 24, wherein the primary side of the transformer connects with an inductor, with operating the DC-DC converter to reduce a change in voltage of the inductor.

* * * * *